United States Patent [19]

Kress et al.

[11] 4,103,511

[45] Aug. 1, 1978

[54] CONNECTING ARRANGEMENT FOR A MACHINE TOOL

[75] Inventors: Willy Kress, Bisingen; Josef Seifert, Grosselfingen, both of Germany

[73] Assignee: Firma Kress elektrik GmbH & Co., Bisingen, Germany

[21] Appl. No.: 729,006

[22] Filed: Oct. 4, 1976

[51] Int. Cl.$^2$ .................... F16C 1/06; F16C 1/12

[52] U.S. Cl. .................... 64/4; 403/349

[58] Field of Search .................... 64/4; 403/348, 349; 285/360, 361, 362, 376, 377, 401

[56] References Cited

U.S. PATENT DOCUMENTS

| | | | |
|---|---|---|---|
| 343,089 | 6/1886 | Symes | 285/377 |
| 783,925 | 2/1905 | Brake | 285/377 |
| 827,739 | 8/1906 | Lingenfelter | 285/377 |
| 1,019,558 | 3/1912 | Thompson | 285/362 |
| 1,533,875 | 4/1925 | McCleary | 285/362 |
| 1,673,723 | 6/1928 | Van Arsdale | 285/377 |
| 2,219,907 | 10/1940 | Ross | 403/349 |
| 2,526,998 | 1/1945 | Davis | 403/349 |
| 3,079,178 | 2/1963 | Simpkins | 285/360 |
| 3,404,365 | 10/1968 | Obeissant | 285/377 |
| 3,472,323 | 10/1969 | Hall | 64/4 |
| 3,724,237 | 4/1973 | Wood | 403/348 |
| 3,736,011 | 5/1973 | Ward | 403/349 |
| 3,929,343 | 12/1975 | Wanner | 403/349 |

*Primary Examiner*—Benjamin W. Wyche
*Assistant Examiner*—R. C. Turner
*Attorney, Agent, or Firm*—Blair & Brown

[57] ABSTRACT

A connecting arrangement for a machine tool in which a driving element and a driven component are constrained from relative twisting by guide pins and are further coupled to transmit torque therethrough. The coupling mechanism is provided with an external release lever so that the faces of the driving and driven elements are in complete registry when so coupled.

6 Claims, 32 Drawing Figures

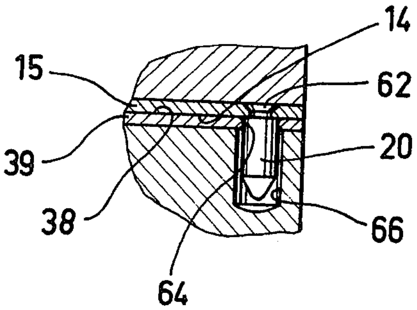
Fig. 11
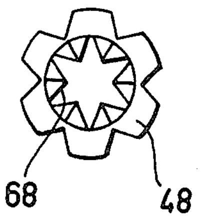
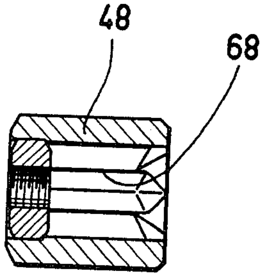
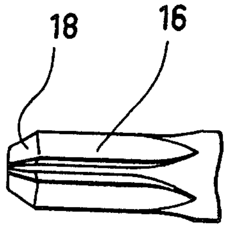
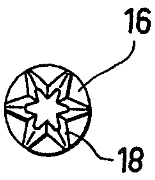
Fig. 13 Fig. 12 Fig. 14 Fig. 15

CONNECTING ARRANGEMENT FOR A MACHINE TOOL

BACKGROUND OF THE INVENTION

The invention relates to an arrangement for connecting an operating instrument with an electromotor driving instrument and a machine tool with a driving shaft protruding from the driving device and a coupling part on the operating device receiving the driving shaft.

Customarily, machine tools are produced either as compact motor devices, or else as so-called adapter devices, where the operating device, f. ex. a circular saw, a grinding device, a compass saw etc., is built on the spindle collar of a driving device normally serving as a hand drill and is driven by means of a hexagon or a flat blade by way of a drilling spindle. Compact motor devices are expensive, since a separate motor and a separate gearing must be provided for each operating device. However, the adapter devices which are altogether cheaper do have considerable disadvantages, to wit:

(a) The attachment and removal of the pertinent operating device from the driving device is so cumbersome that even after a short time in most cases the possibility of exchanging the operating device is no longer used. The connecting of an operating device to the driving device is difficult and time consuming especially because it is not simple to make the two coupling parts intermesh.

(b) Coupling is accomplished in the case of the known devices by means of a polygon on the drilling spindle which polygon engages with the corresponding coupling recess of the operating device. This coupling is flattened relatively quickly, so that considerable play develops since the mutual centering of the driving device and the operating device is very complicated. The operating device is aligned exclusively by means of the spindle collar of the driving device, f. ex. of the drill. In the case of tightening the clamping ring of the operating device, eccentricities develop perforce which lead to the above mentioned damage of the coupling in the course of time and which are the cause of strong coupling noises.

(c) Because of the eccentricities mentioned under (b), the bearings in the area of the coupling can be loaded unilaterally which leads to an increased bearing friction and consequently to a quicker deterioration.

(d) The known kind of connection between the operating device and the driving device leads to large overall construction lengths, which make the machine tool awkward. For this reason, compact devices, where the motor, the gearing and the operating device are frequently preferred despite their considerably higher procurement cost.

SUMMARY OF THE INVENTION

As a result of the invention, an apparatus of the initially mentioned type is to be improved in such a way, that the above described disadvantages do not occur and the possibility is created of connecting individual operating devices with a driving device so quickly, simply and safely, that the high degree of efficiency and handiness of compact devices will be achieved at a considerably more favorable procurement cost and with universal exchangeability of the operating devices.

OBJECTS OF THE INVENTION

According to the invention this task will be solved by the driving device and the operating device having contact surfaces providing equal coverage and runing perpendicularly to the axis of the driving shaft and by providing a high speed coupling between the driving device and operating device, operable from the outside with the contact surfaces joined.

The joined, flat contact surfaces guarantee a jamproof and dislocation free mutual fixing of the two devices without play and eccentricity and an uncomplicated assemblage without problem and a loosening of the two devices is possible.

The housings of the operating device and the driving device pass over into each other without a gap and the result is a small overall length. As a result of that, handling of the entire machine also becomes very simple and the method of operation is equivalent to that of compact devices. Optically too, the machine gives the impression of a compact device.

This development of the connecting apparatus has advantages from the point of view of finishing technique. In case f. ex. that a client desires to obtain a compact device of a certain type, it can be assembled even in the producing plant from a driving device and an operating device, whereby merely the releasable high speed coupling is omitted. In this case, the operating device and the driving device are firmly interconnected. The flat sub-units in the area of the contact surfaces make possible an as cheap and precise fabrication as possible. The parts required for the high speed coupling may be produced from stamped and bending parts at favorable prices.

In an advantageous development of the invention, the driving shaft of the driving part and the receiving coupling parts of the operating device are developed in a self-centering manner. As a result of that, the mounting together of the two devices is still further simplified.

In the case of a preferred embodiment, the high speed coupling is developed as a bayonet coupling, which in the case of joined contact surfaces can be tightened and released from the outside.

As a result of the threadlike bayonet coupling, a very strong close fit of the pertinent operating device of the driving device is possible. Even in the case of wear of the bayonet coupling, there is still a certain reserve available for achieving a firm tightening of the two devices against one another, because of the threadlike effect of said coupling.

The receiving coupling part of the operating device may consist of plastic and thus represents a type of theoretical place of fracture in the case of jammings of the operating device etc. However, embodiments made of steel or aluminum are more resistant.

In the case of this embodiment, the coupling part of the operating device effectively consists of a coupling star adapted to the driving shaft and insertable into the driving bore of said operating device. In the case of breakage or abrasion, this coupling star can easily be exchanged and is kept effectively in the driving bore by a grip screw etc. which can be fastened.

In a advantageous further development of the invention, a receiving part of the bayonet coupling is worked into the contact surface of the operating device and the penetrating part of the bayonet coupling rotatable from the outside protrudes from the contact surface of the driving device. The two devices therefore must be placed against one another only with their contact surfaces as a result of which the driving shaft and the coupling part of the operating device center themselves automatically, and then the part of the bayonet coupling located on the driving device must be twisted into the closing position. The loosening of the two devices from one another is accomplished just as simply and quickly.

Preferably the parts of the bayonet coupling emcompass the driving shaft concentrically so that the centering is still improved thereby.

In the case of a further advantageous development of the invention, a lever projecting radially is relation to the driving shaft, is attached on the rotatable part of the bayonet coupling, which is guided outward through a radial slit disposed behing the contact surface of the driving device. By turning said layer, the operating device can be fixed at any time on the driving device or it can be released from said driving device.

The lever effectively is loaded by a spring in the closing direction of the bayonet coupling, so that in case that osciallations occur in the machine, the closure is not loosened but is tightened even more.

The mutual automatic centerning of the driving device and the operating device during assemblage can be still more improved according to a further proposition of the invention by providing at least two centering pins anchored to one of the contact surfaces and projecting from the latter, which centering pins can always be introduced into a corresponding centering aperture in the other contact surface. In addition, the centering pins absorb the reaction moments when working with the machine tool.

In the case of an embodiment which can be produced particularly simply, the two contact surfaces are formed always by a flat covering flange placed on the housing of the device. The parts of the bayonet coupling in the case of this embodiment can be worked out directly from the parts of the flange by stamping and bending. The anchoring of the centering pins can take place from the direction of the reverse side of the flanges.

The invention is exceedingly versatile in its application. Thus an exceedingly large series of operating devices can be connected within seconds and safely always with the same driving device. Preferably, the operating device is developed as an angle sander, belt sander, grinding pedestal, rocking grinding fixture, polishing fixture, hand plane, surface milling cutter, circular saw, compass saw, chain saw, plate shears, pruning shears, angulartype drill, drill head or pump. All these working devices are to be operated (handled) like a compact device because of their compact assemblage with the driving device.

The handle for the operation of the driving device and thus for the mounting of the assembled machine, runs effectively and generally in parallel to the driving axis of the driving device, beside the latter, as a result of which is universally effective handling of the assembled machine is possible. As a result of that, the machine does practically not differ in dimensions, handiness and appearance from a special device with a firmly attached motor part.

BRIEF DESCRIPTION OF THE DRAWINGS

Embodiments of the invention will be explained in more detail on the basis of the figures.

FIG. 6 is a front view of the device shown in FIG. 1 from which FIG. 3 represents an enlarged section;

FIG. 11 shows a cut along the line XI—XI in FIG. 6;

FIG. 12 shows an axial cut through the star of the coupling of the operating device;

FIG. 13 is a front view of the star of the coupling shown in FIG. 12;

FIG. 14 is a side view of the driving shaft projecting from the operating device;

FIG. 15 is a front view of the driving shaft according to FIG. 14;

DESCRIPTION OF THE PREFERRED EMBODIMENTS

Figure 1:
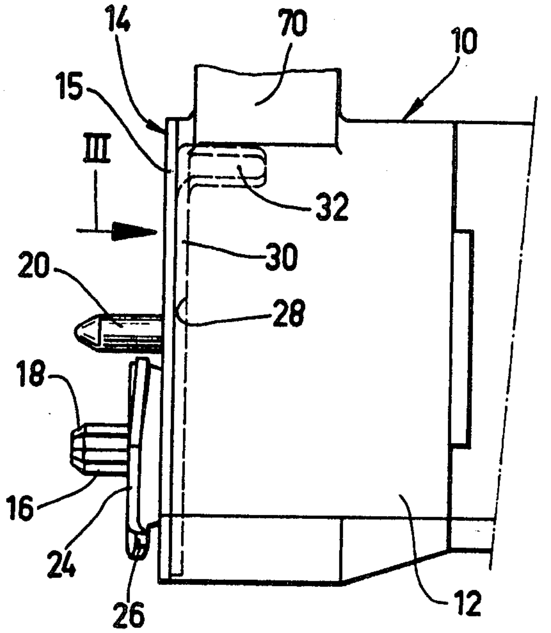
FIG. 1 shows a partial side view of the driving device developed according to the invention.

The driving device 10 shown partially in FIG. 1 has a compact housing 12, the front side of which is closed by a flange 15 forming the flat contact surface 14. From the contact surface 14, the driving shaft 16 developed in the form of a star, projects, the outside end of which has been provided on all sides with bevelings 18 for the purpose of self-centering in the corresponding star of the coupling of the operating device that is to be attached. Furthermore, two centering pins 20 project from the contact surface 14, which can be inserted in corresponding centering bores in the operating device that is to be attached.

Figure 3:
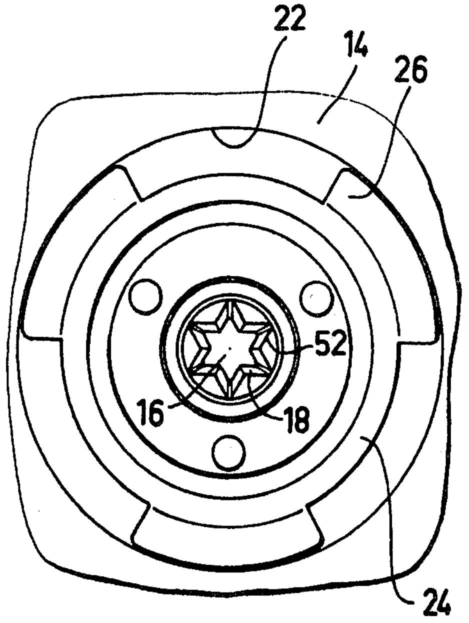
FIG. 3 shows an enlarged partial front view of the device shown in FIG. 1 according to the arrow III.

As can be seen from FIG. 3, the flange 15 has a circular aperture 22, which is disposed concentrically in relation to the driving shaft 16 and through which a rotatably mounted or cylindrical lip 24 of a bayonet coupling with bayonet coupling tabs 26 projects to the outside. Behind the flange 15 of the housing 12, forming the contact surface 14, a radial lateral slit 28 has been provided in the housing, through which a lever 30 with a handle 32 projects radially outward, which is connected firmly with the rotatable part 24 of the bayonet coupling. By operating the lever 30, it is therefore possible to operate the part 24 of the bayonet coupling.

Figure 2:
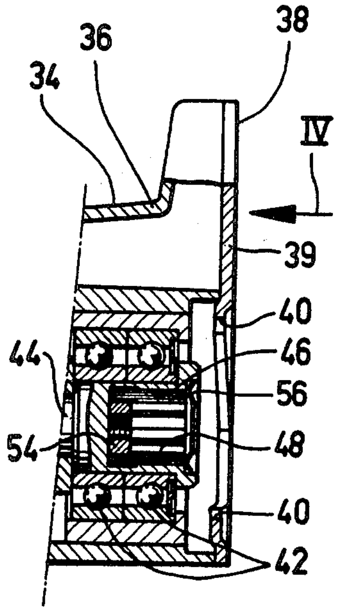
FIG. 2 shows a partial axial cut of an operating device developed according to the invention.
Figure 4:
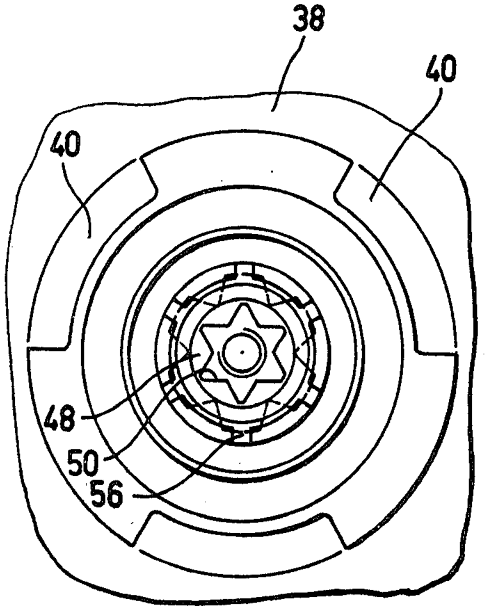
FIG. 4 is an enlarged partial front view of the device shown in FIG. 2 following the arrow IV.

The FIGS. 2 and 4 are representations corresponding to the FIGS. 1 and 3 of an operating device generally designated with 34 that is to be attached to the operating device 10, which operating device likewise has a compact housing 36 which is closed on the front side by a flange 39, which forms a flat contact surface 38 providing equal cover with a contact surface 14. The tabs 26 of the rotatable part 24 of the bayonet coupling can be introduced between the tabs 40 during assembling of the two devices and subsequently the rotatable part may be twisted and thus the tabs may be locked.

The part 44 of the operating device 34 which is to be put in rotation by the driving device is supported by ball bearings 42. A driving bore 46 is provided in the part 44, into which (bore) a coupling star 48 consisting of plastic, has been inserted exchangeably, the inside contour 50 is adapted to the outside contour 52 of the driving shaft. A grip ring 56 is pressed into the part 44 as a safety device against loss. The coupling star 48, since it does indeed consist of plastic, serves as a theoretical site of break in the case of jamings of the operating device. In case said star breaks or is exposed to more considerable abrasion, it can easily be exchanged with the help of the hexagonal nut 54.

Figure 5:
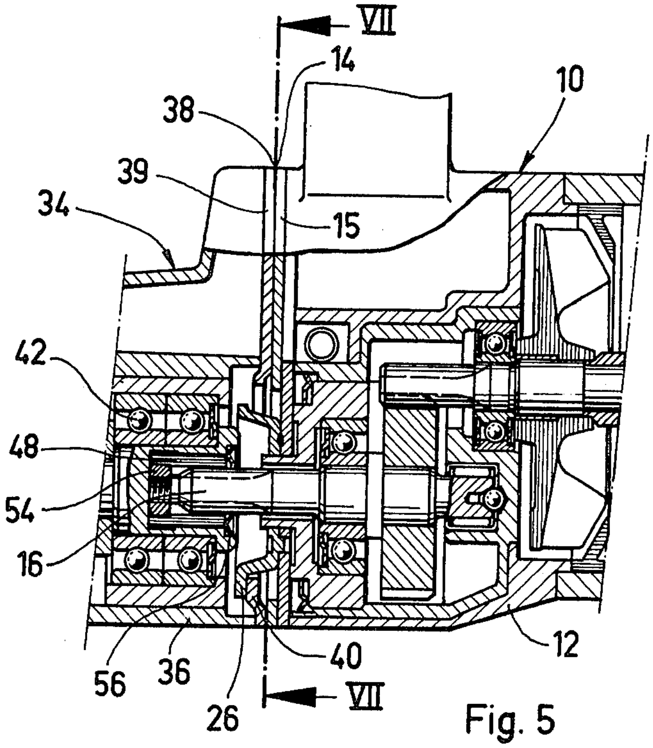
FIG. 5 is an axial cut through the devices in their coupled state shown in the FIGS. 1 an 2.

From FIG. 5, it is clear how the two devices according to FIGS. 1 to 4 are coupled together. The tabs 26 of the rotatable part 24 in the coupled state reach behind the tabs 40 of the fixed part of the bayonet coupling and the driving shaft 16, upon joining together the two devices, penetrates the inside coupling star 48 in a self-centering manner. In this case, as in the following figures, equal parts have been given the same reference numbers as in the preceding figures so that they will not have to be explained once more.

Figure 6:
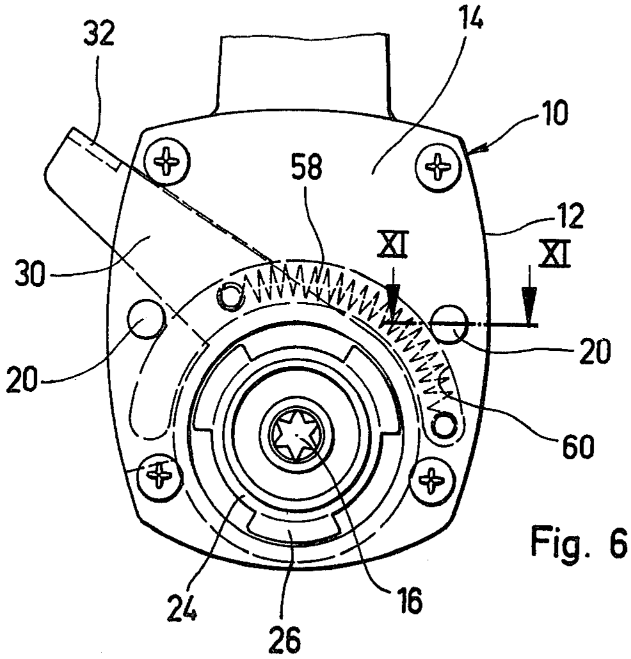

In addition, it is clear from FIG. 6, how the two centering pins 20 are disposed, of which only one is to be seen in FIG. 1. Furthermore, it is apparent from FIG. 6 how the rotatable part 24 of the bayonet coupling is connected firmly with the lever 30 which makes possible an operation of the bayonet coupling from the outside. The lever 30 is connected with the housing 12 by means of a spring 58, which is guided in an arched groove 60 in such a way, that, viewed according to FIG. 6, it is loaded by the spring 58 in clockwise direction, i.e., upon insertion into the fixed part of the bayonet coupling on the operating device in closing direction.

Figure 7:
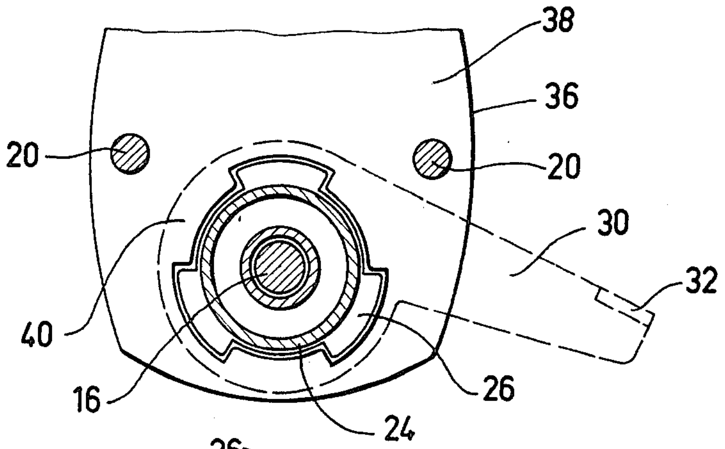
FIG. 7 shows a cut along the line VII-VII in FIG. 5 prior to locking the bayonet coupling.
Figure 8:
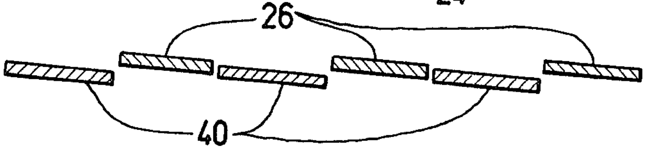
FIG. 8 is a projection of the tabs of the bayonet coupling serving for purposes of locking.
Figure 9:
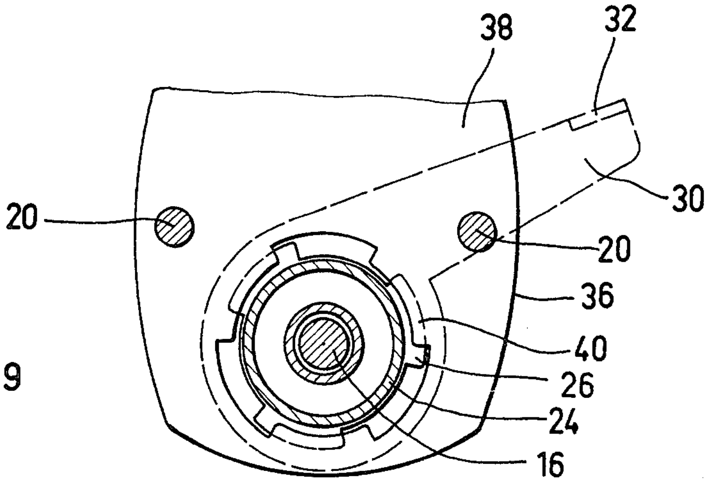
FIG. 9 shows a cut according to FIG. 7 of the bayonet coupling in the locked state.
Figure 10:
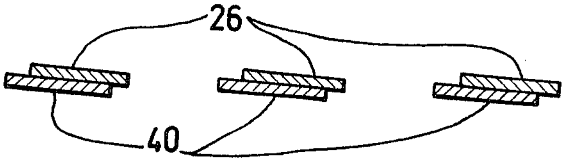
FIG. 10 is a projection according to FIG. 8 in the locked state.

The FIGS. 7 and 8 show the parts pertaining to the bayonet coupling in a non-locked state, while the FIGS. 9 and 10 show the same parts in the locked state of the bayonet closure.

The centering of the centering pins 20 which are anchored in the rear on the flange 15 forming the support 14 by a rivetted joint 62, in centering aperture 64 of the flange 39 forming the supporting surface 38, provided for this purpose, can be seen from the partial cut of the FIG. 11. The centering pins 20, after guiding them through the supporting surface 38, project into corresponding recesses 66 in the housing of the operating device.

Figure 16:
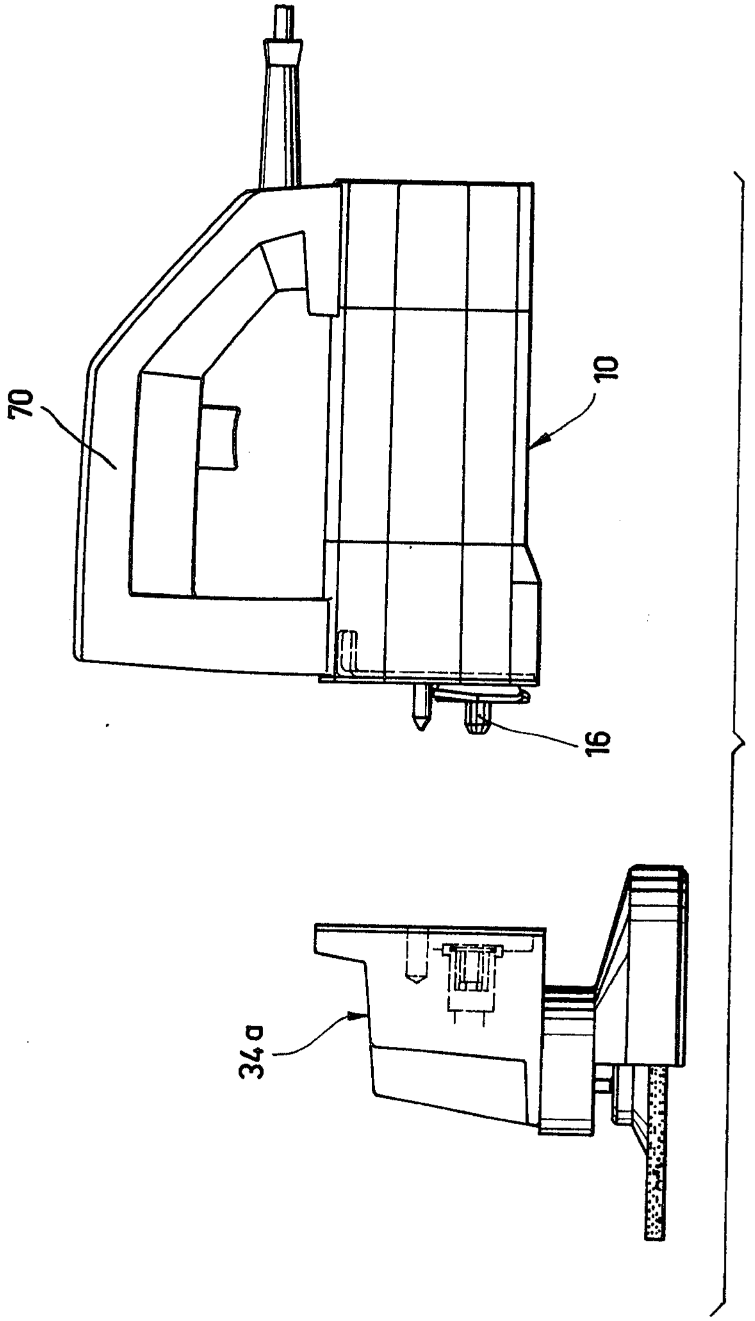
FIG. 16 is an overall view of the driving device and the operating device developed as an angle sander, prior to mounting.
Figure 17:
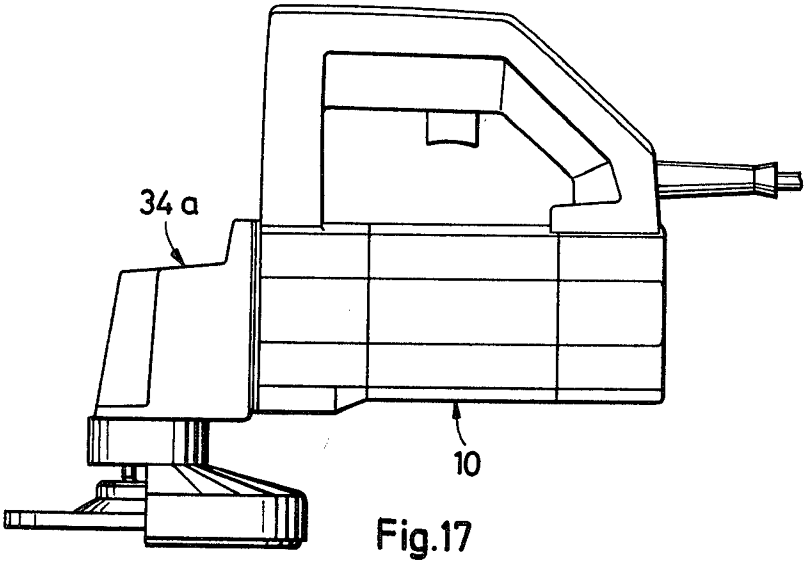
FIG. 17 shows the two devices according to FIG. 16 at a somewhat reduced scale in their assembled state.

The shape of the star-shaped driving shaft 16 with self-centering bevels 18 as well as the coupling star 48 with an inside contour 68 adapted to the contour of the driving shaft 16 and receiving the driving shaft, can be seen from the FIGS. 12 to 15. The handle 70 which in the previous figures has always been shown broken away, can be seen in all following figures in its worked up state running generally parallel to the axis of the driving shaft 16 beside the driving device 10 being handy for all cases of application and compact at the same time. FIG. 16 shows the driving device 10 with an angle sander **34*a* in a not yet assembled state. In the coupled state, these two devices can be seen from FIG. 17**.

All following figures are representations of the driving device according to the invention always coupled to various operating devices and from this the exceedingly versatile applicability and capability for combinations of the driving device with a large number of operating devices into compact and easily manageable machine tools becomes clear.

Figure 18:
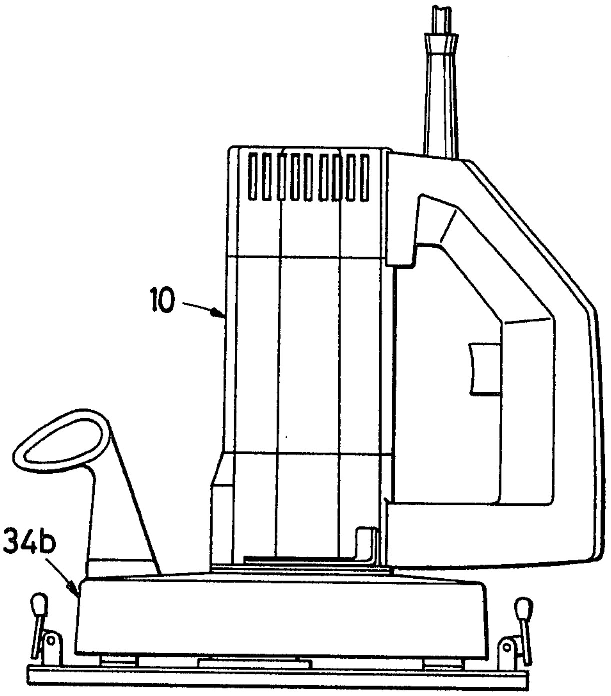
FIG. 18 shows the driving device and operating device developed as a rocking grinding fixture in its assembled state in side view.
Figure 20:
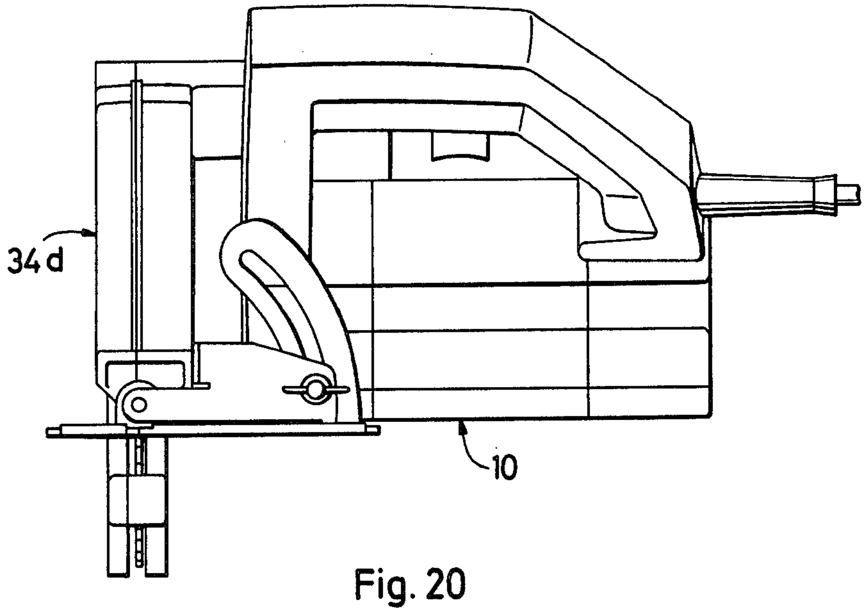
FIG. 19 to 32 show side views of the driving device and various operating devices in their assembled state.
Figure 19:
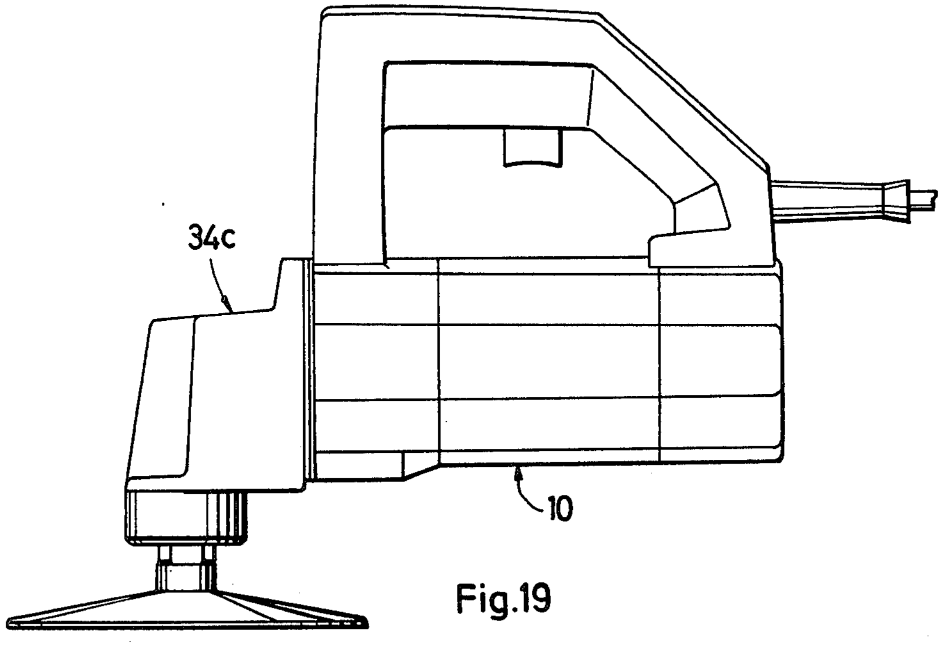
Figure 21:
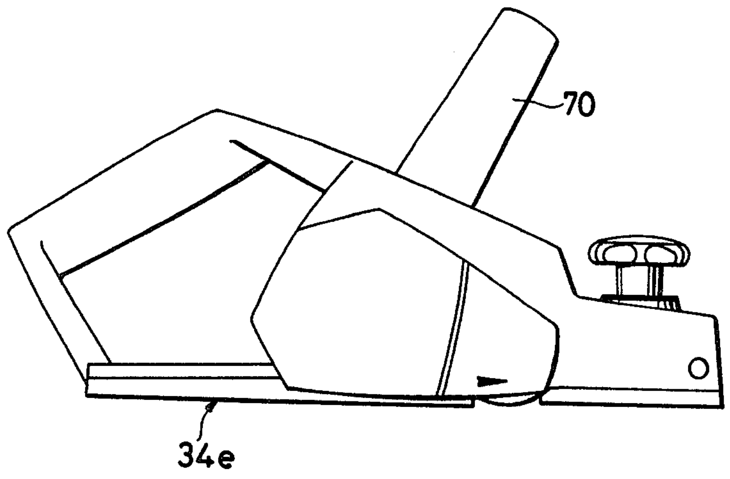
Figure 22:
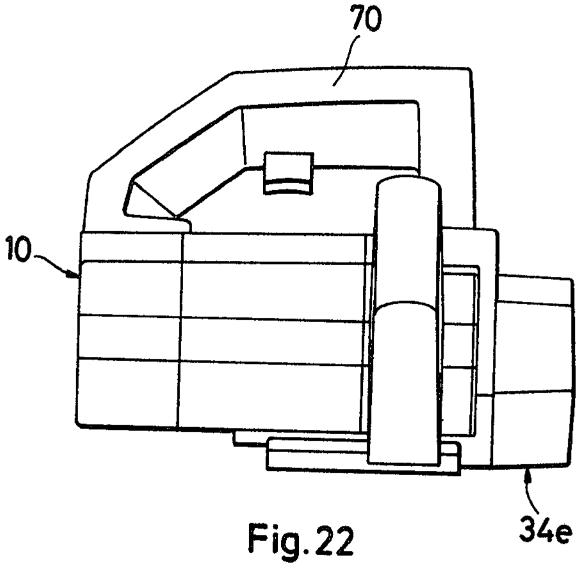
Figure 23:
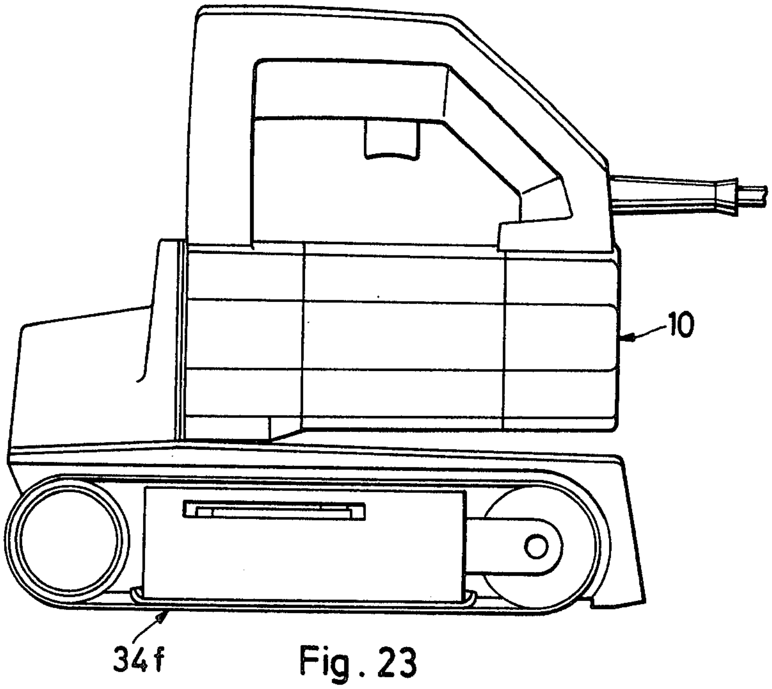
Figure 24:
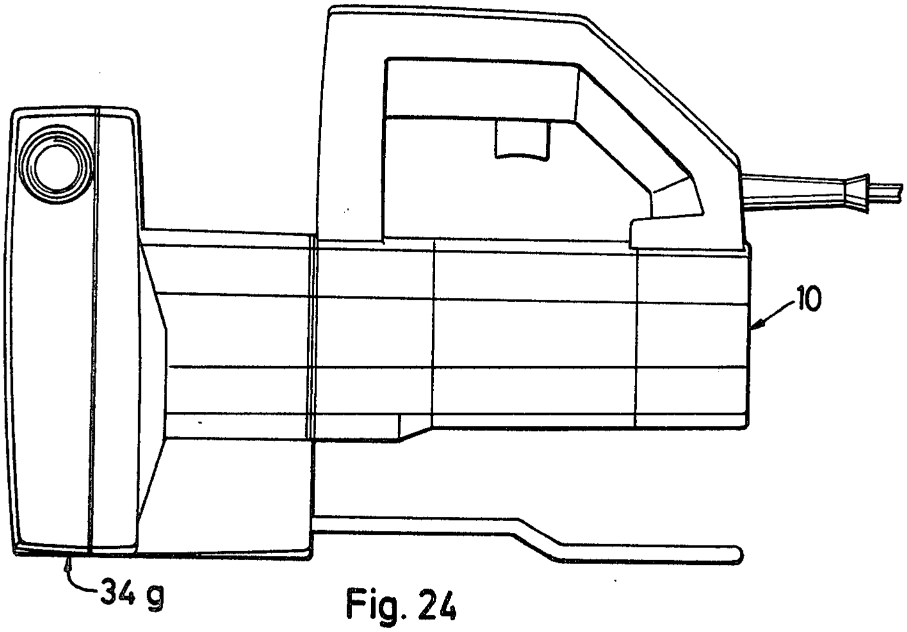
Figure 25:
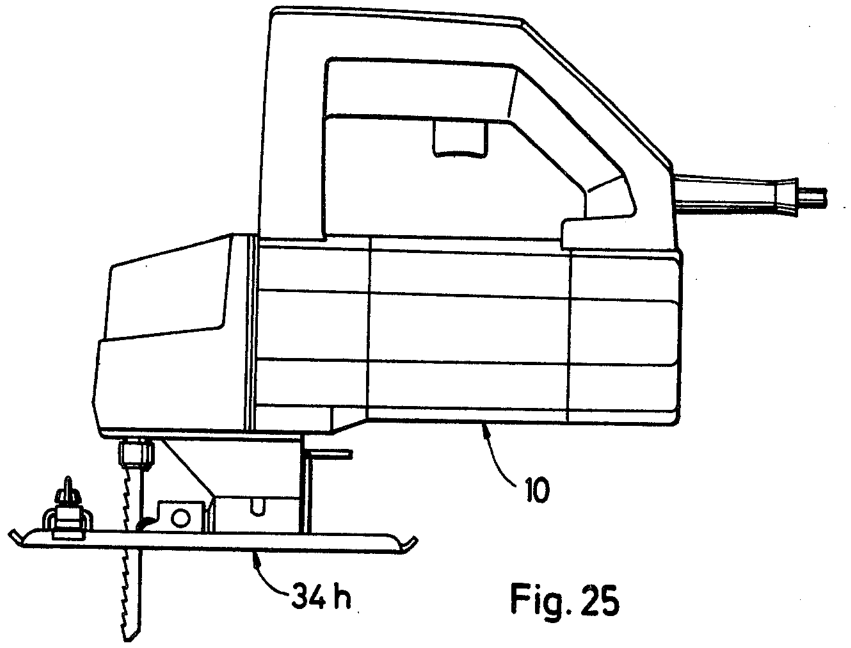
Figure 26:
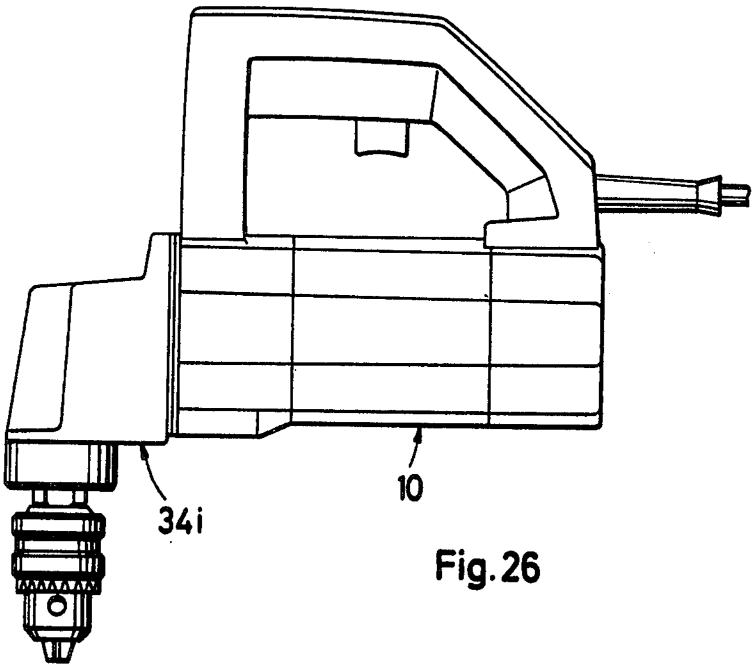
Figure 27:
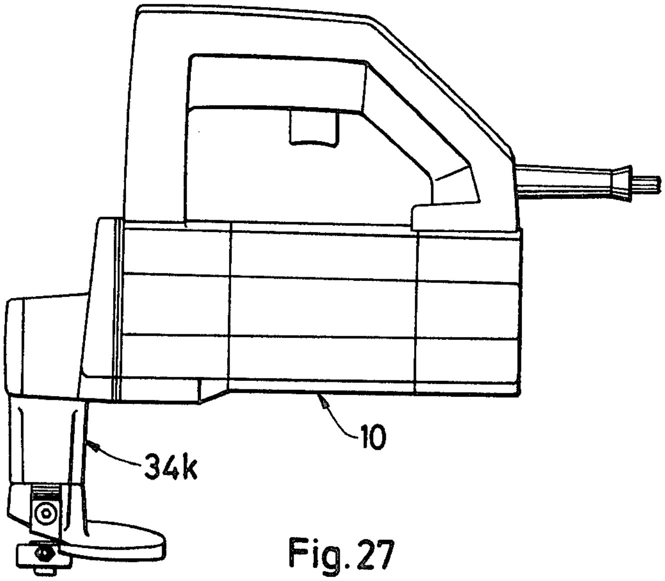
Figure 28:
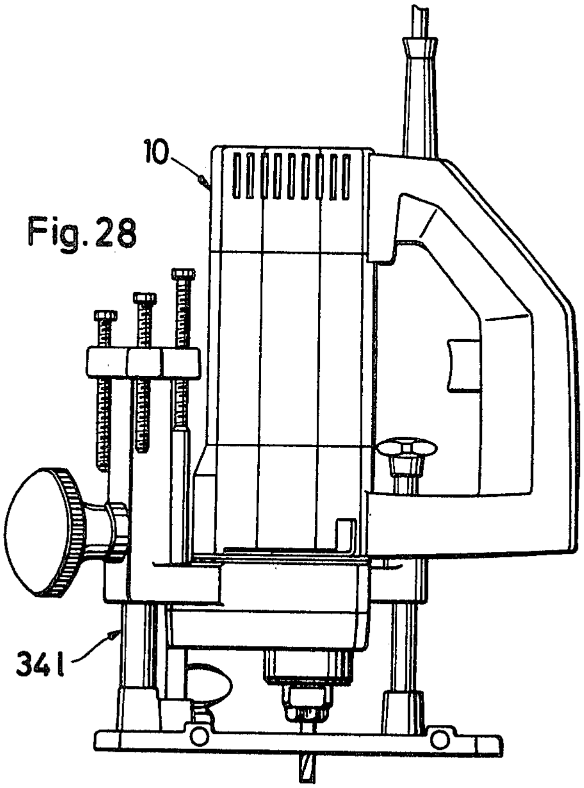
Figure 29:
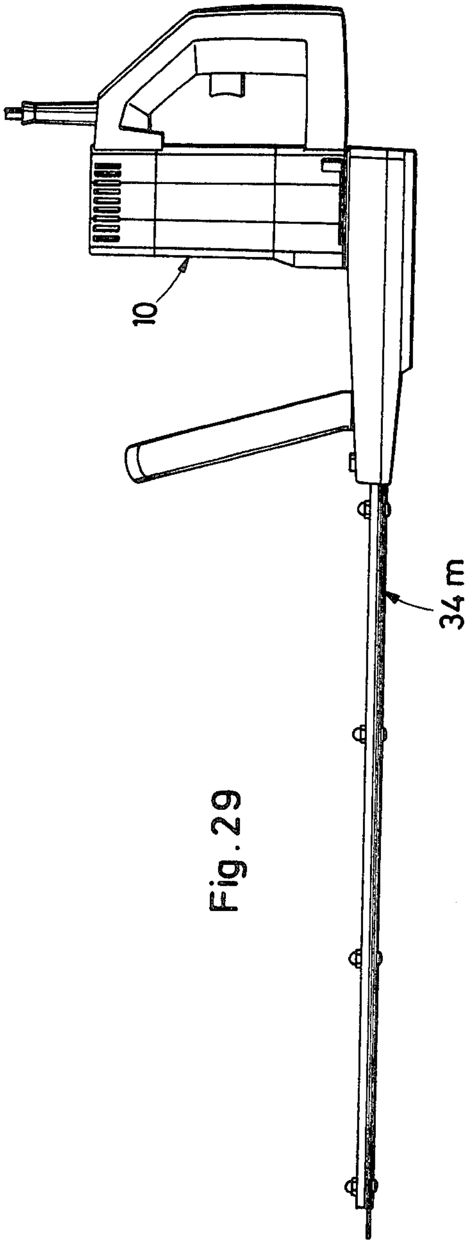
Figure 31:
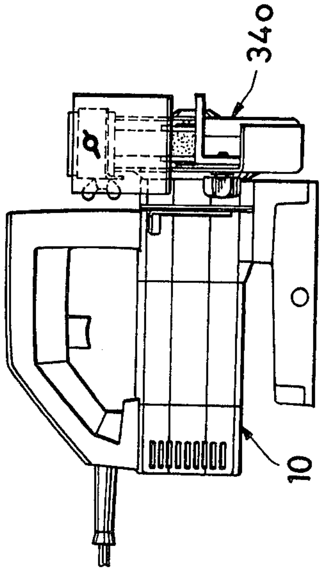
Figure 30:
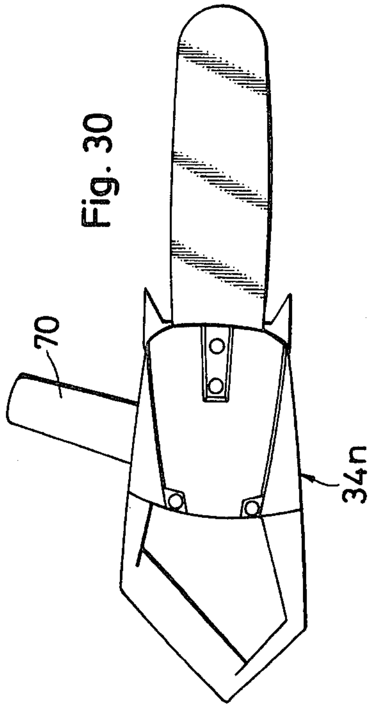
Figure 32:
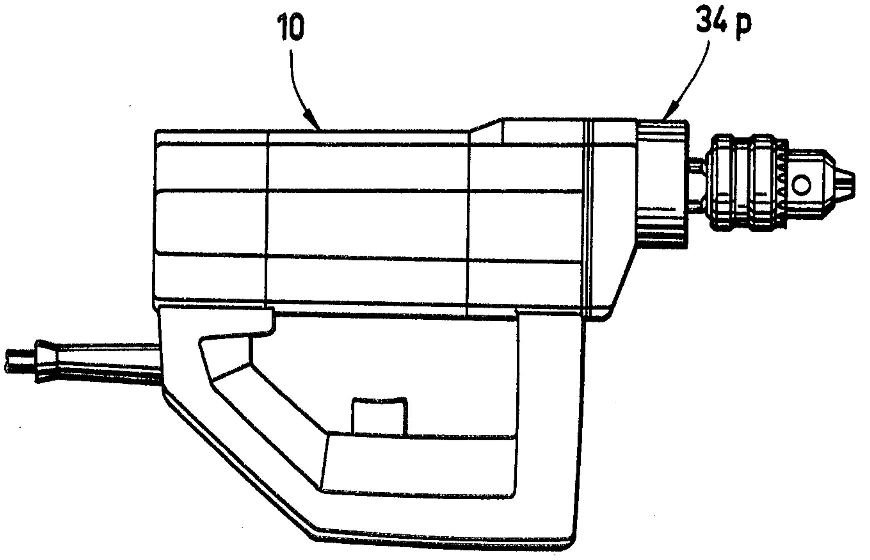

Thus, FIG. 18 shows the driving device 10 wich an attached rocking grinding sander **34*b*, FIG. 19 shows the driving device 10 with attached polishing device 34*c*, FIG. 20 with an attached circular saw 34*d*, FIG. 21 with attached plane 34*e* in side view and FIG. 22 in front view, FIG. 23 with attached belt sander 34*f*, FIG. 24 with an attached pump 34*g*, FIG. 25 with attached compass saw 34*h*, FIG. 26 with an attached angular type drill 34*i*, FIG. 27 with attached plate shearing attachment 34*k*, FIG. 28 with an attached surface milling cutter arrangement 34*l*, FIG. 29 with attached pruning shears 34*m*, FIG. 30 with attached chain saw 34*n*, FIG. 31 with attached grinding pedestal 34*o* and FIG. 32 with attached drill head 34*p***.

We claim:

1. Connecting arrangement for a machine tool having an electromotor driving device in a housing and an exchangeable operating device comprising a driving shaft projecting from the housing of the driving device and a receiving coupling part in a housing of the operating device receiving the driving shaft, so that the housings of the driving device and operating device may be fixed together in a centered manner, wherein the housings of the driving device and operating device have flat, perfectly equal contact surfaces disposed perpendicularly in relation to the driving shaft, and wherein the housings are fixed mutually untwistably on their contact surface by means of axially outward protruding centering pins on one contact surface and centering openings on the other contact surface receiving the centering pins, further comprising coupling means operated from the outside of said contact surfaces when said contact surfaces are fitted against each other in a twist-secure manner.

2. Manually operated machine tool as in claim 1, in which the driving shaft and the receiving coupling part have chamferings for the automatic coupling.

3. Apparatus as in claim 2, in which the receiving coupling of the coupling means is disposed within the contact surface of the operating device and said coupling means further includes a cylindrical lip surrounding said driving shaft having coupling tabs on the outer periphery of said lip extending from the contact surface of the driving device which serve to engage complementally formed tabs disposed around said receiving coupling part on said operating device.

4. Apparatus as in claim 3, including a lever which projects radially in relation to the driving shaft and is attached to the cylindrical lip of the coupling means and said lever is guided to the outside of said housing through a radial lateral slit disposed behind the contact surface of the driving device so as to provide disengagement of said coupling means remote from the contact surfaces.

5. Apparatus as in claim 4, characterized in that the lever is biased by a spring in the direction of closing of the coupling means.

6. Apparatus as in claim 5, wherein the two contact surfaces are both formed with a flat covering flange placed onto the housings of the devices.

* * * * *